United States Patent
Volkovs et al.

(10) Patent No.: US 12,321,861 B2
(45) Date of Patent: *Jun. 3, 2025

(54) INITIALIZATION OF PARAMETERS FOR MACHINE-LEARNED TRANSFORMER NEURAL NETWORK ARCHITECTURES

(71) Applicant: THE TORONTO-DOMINION BANK, Toronto (CA)

(72) Inventors: Maksims Volkovs, Toronto (CA); Xiao Shi Huang, Toronto (CA); Juan Felipe Perez Vallejo, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 97 days.

This patent is subject to a terminal disclaimer.

(21) Appl. No.: 18/303,179

(22) Filed: Apr. 19, 2023

(65) Prior Publication Data

US 2023/0252301 A1 Aug. 10, 2023

Related U.S. Application Data

(63) Continuation of application No. 17/169,211, filed on Feb. 5, 2021, now Pat. No. 11,663,488.

(Continued)

(51) Int. Cl.
*G06F 9/355* (2018.01)
*G06F 9/30* (2018.01)
(Continued)

(52) U.S. Cl.
CPC ......... *G06N 3/084* (2013.01); *G06F 9/30036* (2013.01); *G06F 9/3555* (2013.01);
(Continued)

(58) Field of Classification Search
CPC ........ G06N 20/00; G06N 3/045; G06N 3/084; G06F 9/30036; G06F 18/214; G06F 9/463; G06F 9/3555; G06F 18/2413
(Continued)

(56) References Cited

U.S. PATENT DOCUMENTS 11,126,660 B1  9/2021  Sen et al.
2018/0075343 A1* 3/2018  van den Oord ......... G06F 40/44
(Continued)

FOREIGN PATENT DOCUMENTS

WO  WO 2018/126325 A1  7/2018
WO  WO 2019/220128 A1  11/2019

OTHER PUBLICATIONS

Bilkhu, M. et al., "Attention is All You Need for Videos: Self-Attention Based Video Summarization Using Universal Transformers," arXiv: 1906.02792, Jun. 6, 2019, pp. 1-15.
(Continued)

*Primary Examiner* — Chun Kuan Lee
(74) *Attorney, Agent, or Firm* — Patent Capital Group (57) ABSTRACT

An online system trains a transformer architecture by an initialization method which allows the transformer architecture to be trained without normalization layers of learning rate warmup, resulting in significant improvements in computational efficiency for transformer architectures. Specifically, an attention block included in an encoder or a decoder of the transformer architecture generates the set of attention representations by applying a key matrix to the input key, a query matrix to the input query, a value matrix to the input value to generate an output, and applying an output matrix to the output to generate the set of attention representations. The initialization method may be performed by scaling the parameters of the value matrix and the output matrix with a
(Continued)

factor that is inverse to a number of the set of encoders or a number of the set of decoders.

20 Claims, 5 Drawing Sheets

Related U.S. Application Data (60) Provisional application No. 62/976,040, filed on Feb. 13, 2020.

(51) Int. Cl.
| | |
|---|---|
| *G06F 9/46* | (2006.01) |
| *G06F 18/214* | (2023.01) |
| *G06F 18/2413* | (2023.01) |
| *G06N 3/045* | (2023.01) |
| *G06N 3/084* | (2023.01) |
| *G06N 20/00* | (2019.01) |

(52) U.S. Cl.
CPC ............ *G06F 9/463* (2013.01); *G06F 18/214* (2023.01); *G06N 20/00* (2019.01)

(58) Field of Classification Search
USPC .......................................................... 712/7
See application file for complete search history.

(56) References Cited

U.S. PATENT DOCUMENTS

| | | | |
|---|---|---|---|
| 2018/0300400 A1 | 10/2018 | Paulus | |
| 2018/0329897 A1* | 11/2018 | Kalchbrenner | ......... G06F 40/44 |
| 2019/0046068 A1 | 2/2019 | Ceccaldi et al. | |
| 2019/0130213 A1 | 5/2019 | Shazeer et al. | |
| 2019/0287012 A1 | 9/2019 | Celikyilmaz et al. | |
| 2021/0381992 A1 | 12/2021 | Aguiar | |

OTHER PUBLICATIONS

Chen, M.X. et al., "The Best of Both Worlds: Combining Recent Advances in Neural Machine Translation," Proceedings of the 56th Annual Meeting of the Association for Computational Linguistics, Jul. 2018, pp. 76-86.
Chen, Q. et al., "Behavior Sequence Transformer for E-commerce Recommendation in Alibaba," arXiv:1905.06874, May 15, 2019, pp. 1-4.
Devlin, J. et al., "BERT: Pre-training of Deep Bidirectional Transformers for Language Understanding," arXiv:1810.04805, Oct. 11, 2018, pp. 1-14.
Gehring, J. et al., "Convolutional Sequence to Sequence Learning," Proceedings of the 34th International Conference on Machine Learning, Aug. 2017, pp. 1243-1252.
Glorot, X. et al., "Understanding the Difficulty of Training Deep Feedforward Neural Networks," Proceedings of the 13th International Conference on Artificial Intelligence and Statistics (AISTATS), May 2010, pp. 249-256.
Lan, Z. et al., "ALBERT: A Lite BERT for Self-supervised Learning of Language Representations," ICLR, Apr. 2020, pp. 1-17.
Liu, L. et al., "On the Variance of the Adaptive Learning Rate and Beyond," arXiv:1908.03265, Aug. 8, 2019, pp. 1-14.
Ma, J. et al., "On the Adequacy of Untuned Warmup for Adaptive Optimization," arXiv:1910.04209, Oct. 9, 2019, pp.
Nguyen, T.Q. et al., "Transformers without Tears: Improving the Normalization of Self-Attention," arXiv:1910.05895, Dec. 30, 2019, pp.
Ott, M. et al., "Scaling Neural Machine Translation," Proceedings of the Third Conference on Machine Translation (WMT), vol. 1: Research Papers, Oct. 2018, pp. 1-9.
PCT International Search Report and Written Opinion, PCT Application No. PCT/CA2021/050130, Apr. 26, 2021, 8 pages.
Popel, M. et al., "Training Tips for the Transformer Model," The Prague Bulletin of Mathematical Linguistics, No. 110, Apr. 2018, pp. 43-70.
Rikters, M., "Impact of Corpora Quality on Neural Machine Translation," arXiv:1810.08392, Oct. 19, 2018, pp. 1-8.
Stanojević, M. et al., "BEER: Better Evaluation as Ranking," Proceedings of the Ninth Workshop on Statistical Machine Translation, Jun. 2014, pp. 414-419.
Vaswani, A. et al., "Attention Is All You Need," 31st Conference on Neural Information Processing Systems (NIPS 2017), Dec. 2017, pp. 1-11.
Wang, Q. et al., "Learning Deep Transformer Models for Machine Translation," Proceedings of the 57th Annual Meeting of the Association for Computational Linguistics, Jul. 2019, pp. 1810-1822.
Xiong, R. et al., "On Layer Normalization in the Transformer Architecture," Proceedings of the $37^{th}$ International Conference on Machine Learning, Jul. 2020, pp. 1-10.
Yang, Z. et al., "XLNet: Generalized Autoregressive Pretraining for Language Understanding," $33^{rd}$ Conference on Neural Information Processing Systems (NeurIPS 2019), Dec. 2019, pp. 1-11.
Zhang, H. et al., "Fixup Initialization: Residual Learning Without Normalization," International Conference on Learning Representations, May 2019, pp. 1-16.
Zhang, W. et al., "Bridging the Gap between Training and Inference for Neural Machine Translation," Proceedings of the 57th Annual Meeting of the Association for Computational Linguistics, Aug. 2019, pp. 4334-4343.
United States Office Action, U.S. Appl. No. 17/169,211, filed Oct. 6, 2022, 9 pages.

* cited by examiner

INITIALIZATION OF PARAMETERS FOR MACHINE-LEARNED TRANSFORMER NEURAL NETWORK ARCHITECTURES

CROSS-REFERENCE TO RELATED APPLICATIONS

This application is a continuation of pending U.S. patent application Ser. No. 17/169,211, filed on Feb. 5, 2021, entitled "Initialization of Parameters for Machine-Learned Transformer Neural Network Architectures", which claims the benefit of and priority to U.S. Provisional Application No. 62/976,040, filed Feb. 13, 2020, both of which are hereby incorporated by reference in their entireties.

BACKGROUND

This invention relates generally to transformer neural network architectures, and more particularly to initializing parameters during training of transformer architectures.

Transformer architectures are machine-learned neural network models used for, e.g., natural language processing (NLP) applications. For example, a transformer architecture may receive a sequence of input embeddings that represents a question and generate a sequence of output embeddings that represent an answer to the question. As another example, the transformer architecture may receive a sequence of input embeddings that represents a sentence in English and generate a sequence of output embeddings that represents a translation of the sentence in French. As yet another example, the transformer architecture may receive a sequence of input embeddings that represents a paragraph of text and generate a sequence of output embeddings that represents a summarized version of the text.

A transformer architecture includes a set of encoders and a set of decoders coupled to the set of encoders. An encoder is coupled to receive a set of input representations and generate an encoded output, and a decoder is coupled to receive a set of input representations that include the encoded output of the encoders and generate a decoded output that can be used to generate word predictions. Typically, an encoder or a decoder in the transformer architecture includes an attention block that is coupled to receive an input key, an input query, an input value and generate a set of attention representations. The attention block allows an attention representation of an encoder or decoder to respectively encode or decode a respective input based on the associations between the respective input to other inputs in the set.

In practice, the transformer architecture may also include additional blocks, such as multi-layer perceptron (MLP) neural network layers and normalization layers, within an encoder or a decoder that contribute to improving the accuracy of the model. Thus, the number of parameters of the transformer architecture that need to be determined during the training process may quickly increase, especially when there are a significant number of encoders and decoders. Moreover, the training process for a transformer architecture often involves learning rate warmup, in which the learning rate for the parameters are gradually increased at the start of the training process, leading to prohibitively slow training time and computational efficiency. While there are other methods that try to improve the training process, these methods require changing the architecture of the transformer model or result in sub-optimal prediction accuracies.

SUMMARY

An online system trains a machine-learned transformer architecture by an initialization method that allows the transformer architecture to be trained without normalization layers of learning rate warmup, resulting in significant improvements in computational efficiency and training time for transformer architectures. Specifically, an attention block included in an encoder or a decoder of the transformer architecture generates the set of attention representations by applying a key matrix to the input key, a query matrix to the input query, a value matrix to the input value to generate an output, and applying an output matrix to the output to generate the set of attention representations. In one embodiment, the initialization method is performed by scaling the parameters of the value matrix and the output matrix with a factor that is inverse to a number of the set of encoders or a number of the set of decoders.

The initialization method results from a previously unknown insight that learning rate warmup is needed during the training process of the transformer architecture because of the presence of normalization layers within the set of encoders and the set of decoders. By deploying such an initialization method, the online system can train transformer architectures without normalization layers and thus, without learning rate warmup. Moreover, the initialization method allows the online system to train deep transformer architectures with a significant number (e.g., 200 or more) of encoders and decoders that may open up new avenues for improvement in prediction accuracies or transformer architecture.

Specifically, during the training process, the online system accesses a machine-learned model including a set of encoders and a set of decoders. The set of encoders are coupled to receive a sequence of input embeddings and generate an encoded output. The set of decoders are coupled to receive a sequence of output embeddings and the encoded output from the set of encoders and generate a prediction for a next word. Specifically, at least one encoder of the set of encoders or at least one decoder of the set of decoders may include an attention block. The online system initializes parameters of the machine-learned model including parameters of the value matrix and the output matrix. The online system scales parameters of the value matrix and the output matrix by multiplying a factor that is inverse to a number of residual blocks in the set of encoders or a number of the set of decoders. A residual block is any block that is coupled to receive a set of inputs and generate a set of outputs, and in which the set of inputs are combined with the set of outputs to generate a combined representation. The combined representation can be fed into another block or layer as the inputs.

The online system obtains a set of training text that each includes an ordered set of training input embeddings and an ordered set of training output embeddings. For each training text in the set, the online system generates one or more estimated output embeddings by applying the set of encoders and the set of decoders to the ordered set of training input embeddings. The online system determines a loss function indicating a difference between the one or more estimated output embeddings and the ordered set of training output embeddings. The online system updates the parameters of the machine-learned model to reduce the loss function for the training text in the set. This process is repeated for the next set of training text until a convergence criteria for the parameters is reached.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

An online system trains a machine-learned transformer architecture by an initialization method that allows the transformer architecture to be trained without normalization layers of learning rate warmup, resulting in significant improvements in computational efficiency and training time for transformer architectures. Specifically, an attention block included in an encoder or a decoder of the transformer architecture generates the set of attention representations by applying a key matrix to the input key, a query matrix to the input query, a value matrix to the input value to generate an output, and applying an output matrix to the output to generate the set of attention representations. In one embodiment, the initialization method is performed by scaling the parameters of the value matrix and the output matrix with a factor that is inverse to a number of residual blocks in the set of encoders or a number of the set of decoders.

System Environment

Figure 1:
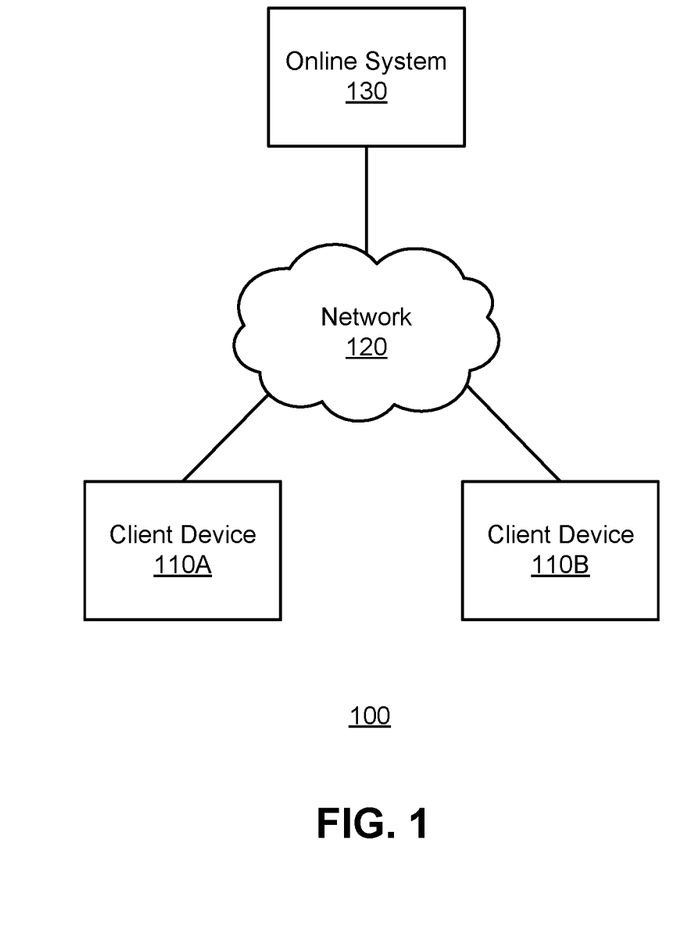
FIG. 1 is a high level block diagram of a system environment for an online system, in accordance with an embodiment.

FIG. 1 is a high level block diagram of a system environment 100 for an online system 130, in accordance with an embodiment. The system environment 100 shown by FIG. 1 includes one or more client devices 110A, 110B, a network 120, and an online system 130. In alternative configurations, different and/or additional components may be included in the system environment 100.

The online system 130 receives requests from client devices 110A, 110B to perform one or more tasks using machine-learned models. In one embodiment, the tasks may be related to natural language processing (NLP) applications, and the online system 130 may train and deploy machine-learned models that are configured to perform or aid in these tasks. Typically, NLP tasks involve using artificial intelligence to analyze and understand language and may include a variety of tasks including but not limited to sentiment analysis, text summarization, text translation, auto-correct, chatbot solutions, and the like. Responsive to receiving a request, the online system 130 encodes input text in the form of embedding vectors in a latent space. The online system 130 applies the one or more machine-learned models to the input embeddings to generate output text that is a response to the task of interest.

For example, a machine-learned model servicing a chatbot application may receive a sequence of input embeddings that represents a question and generate a sequence of output embeddings that represents an answer to the question. As another example, a machine-learned model for automatic language translation may receive a sequence of input embeddings that represents a sentence in English and generate a sequence of output embeddings that represents a translation of the sentence in French. As yet another example, a machine-learned model for language summarization may receive a sequence of input embeddings that represents a paragraph of text and generate a sequence of output embeddings that represents a summarized version of the text.

Figure 2:
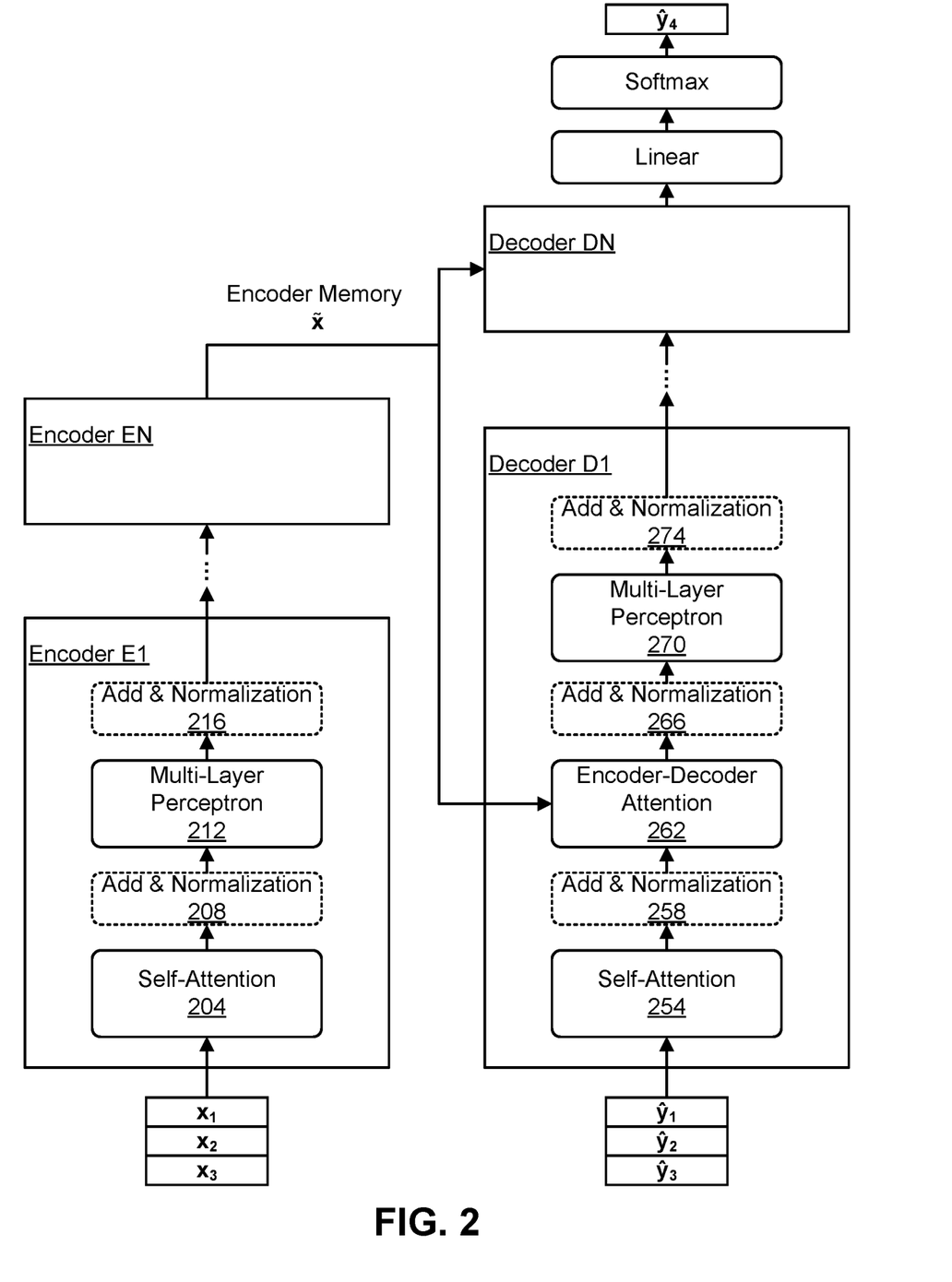
FIG. 2 illustrates an example inference process for a machine-learned model with a transformer architecture, in accordance with an embodiment.

FIG. 2 illustrates an example inference process for a machine-learned model with a transformer architecture, in accordance with an embodiment. In one embodiment, the online system 130 trains and deploys a machine-learned model with a transformer architecture. As shown in FIG. 2, the transformer architecture includes a set of N encoders E1, E2, . . . , EN and a set of N decoders D1, D2, . . . , DN coupled to the set of encoders. An encoder is coupled to receive a set of input representations and generate an encoded output. A decoder is coupled to receive a set of input representations that include the encoded output of the encoders and generate a decoded output that can be used to generate word predictions.

In the example shown in FIG. 2, the online system 130 may receive a question "how are you?" received at a chatbot application, and a request to generate an answer to the question. The online system 130 encodes the question as a set of input embeddings $x_1$, $x_2$, $x_3$ that each represent the words "how," "are," "you?" respectively. In particular, the first encoder E1 may be coupled to receive a set of input representations that are the set of encoded input embeddings and generate an encoded output. Each subsequent encoder may be coupled to receive a set of input representations that are the encoded output of a previous encoder and generate an encoded output for itself. For example, the last encoder EN may be coupled to receive a set of input representations that are the encoded output of the previous encoder EN−1 and generate a final encoded output $\tilde{x}$ for the set of encoders.

The first decoder D1 may be coupled to receive a set of input representations including a set of output embeddings and the encoded output $\tilde{x}$ of the final encoder EN and generate a decoded output that can be used to generate word predictions. The output embeddings represent a sequence of word predictions that were generated by the machine-learned model at previous timesteps during the deployment process. In the example shown in FIG. 2, the transformer architecture may have generated a sequence of output embeddings $\hat{y}_1$, $\hat{y}_2$, $\hat{y}_3$ at previous timesteps that each represent the words "hello," "I," "am," respectively. Each subsequent decoder may be coupled to receive a set of input representations that are the decoded output of a previous decoder and the final encoded output $\tilde{x}$ for the set of encoders and generate a decoded output for itself. For example, the last decoder DN may be coupled to receive a set of input representations that are the decoded output of the previous decoder DN−1 and the final encoded output $\tilde{x}$ for the set of encoders and generate a final decoded output $\hat{y}$.

The transformer architecture also includes one or more blocks that are coupled to receive the final decoded output $\hat{y}$ and generate an output embedding representing the next word prediction. In the example shown in FIG. 2, the transformer architecture includes a linear neural network layer coupled to receive the final decoded output $\hat{y}$ and generate an output. The transformer architecture also includes a softmax layer coupled to receive the output of the linear neural network layer and generate an output embedding prediction $\hat{y}_4$ by transforming the output of the linear layer with a softmax function. The output embedding prediction $\hat{y}_4$ represents the next word prediction that should come after the existing predictions represented by the sequence of output embeddings $\hat{y}_1$, $\hat{y}_2$, $\hat{y}_3$. In the example shown in FIG. 2, the output embedding prediction $\hat{y}_4$ may represent the word "fine."

In the subsequent timestep during the deployment process, the first decoder D1 may now be coupled to receive the next sequence of output embeddings $\hat{y}_2$, $\hat{y}_3$, $\hat{y}_4$, and this decoding process is repeated until all predictions for the sequence of input embeddings are generated. For example, the decoding process may be repeated until the next word prediction generated by the transformer architecture is an end token (e.g., period "." or an "<end>" indicator) that signals that all predictions for the given sequence of input embeddings have been generated.

Typically, an encoder or a decoder in the transformer architecture includes one or more attention blocks. An attention block is coupled to receive an input key a, an input query b, and an input value c and generate a set of attention representations. The attention block allows an attention representation of an encoder or decoder to respectively encode or decode a respective input based on the associations between the respective input to other inputs to the attention block. Specifically, in one embodiment, an attention block generates the set of attention representations by applying a key matrix k to the input key a, a query matrix q to the input query b, and a value matrix v to the input value c to generate an output, and applying an output matrix w to the output to generate the set of attention representations. The parameters of the key matrix k, the query matrix q, the value matrix v, and the output matrix w are learned during the training process of the transformer architecture.

The example shown in FIG. 2 is described with respect to an attention block that includes one or more key matrices k, query matrices q, and value matrices v that each have a set of trained parameters. However, it should be appreciated that in other embodiments, the attention representations can be generated by performing any type of operation(s) that involves applying a set of trained parameters to the input key a, input query b, or input value c. The operation may be represented as a matrix operation but is not limited thereto. For example, the attention block may include one or more neural network layers (e.g., fully connected layers, skip layers, etc.) that are coupled to receive the input key a, input query b, or input value c and generate an output by applying a set of parameters for the neural network layers to each of the input key a, input query b, or input value c to generate an output. The attention block may further include one or more neural network layers (e.g., fully connected layer, skip layers, etc.) coupled to receive the output and generate the set of attention representations by applying a set of parameters for the neural network layers to the output.

Specifically, an encoder includes an attention block that is a self-attention block coupled to receive an input key a, an input query b, and an input value c that each corresponds to a common set of inputs. For example, the self-attention block 204 in the first encoder E1 is coupled to receive an input key a, an input query b, and an input value c that each are the set of input embeddings $x_1$, $x_2$, $x_3$ and generate a set of attention representations. An attention representation for the input embedding $x_1$ in the input query b may be an encoding that incorporates associations between the input embedding $x_1$ to other inputs $x_2$, $x_3$ in the set. The self-attention block in a subsequent encoder (e.g., encoders E2, . . . , EN) is coupled to receive an input key a, an input query b, and an input value c that each corresponds to the encoded output of a previous encoder and similarly generate a set of attention representations.

An encoder may also include a first add and normalization layer placed after the self-attention block. In the example shown in FIG. 2, the first encoder E1 includes a first add and normalization layer 208. The first add and normalization layer combines the set of attention representations generated by the self-attention block with the set of inputs received at the self-attention block to generate a combined representation. Thus, as defined herein, the self-attention block in an encoder may be a residual block in which the set of inputs to the block, without performing any operation, are combined with the set of outputs generated by the block before being input to the next layer. The first add and normalization layer may further normalize the combined representation by, for example, dividing each element of the combined representation with the vector magnitude of the combined representation.

The encoder further includes a multi-layer perceptron (MLP) block that includes one or more neural network layers with a set of trained parameters. In the example shown in FIG. 2, the first encoder E1 includes an MLP block 212. The MLP block is coupled to receive a set of inputs that are the outputs of the first add and normalization layer and generate an MLP output by applying the set of parameters to the set of inputs. The encoder may further include a second add and normalization layer placed after the MLP block. In the example shown in FIG. 2, the first encoder E1 includes a second add and normalization layer 216. The second add and normalization layer combines the MLP output generated by the MLP block with the set of inputs received at the MLP block to generate a combined representation. Thus, the MLP block in an encoder may also be configured as a residual block. The second add and normalization layer may further normalize the combined representation to generate the encoded output for the encoder.

Similarly, a decoder also includes an attention block that is a self-attention block. For example, the self-attention block 254 in the first decoder D1 is coupled to receive an input key a, an input query b, and an input value c that each corresponds to the set of output embeddings $\hat{y}_1$, $\hat{y}_2$, $\hat{y}_3$ and generate a set of attention representations. An attention representation for an output embedding $\hat{y}_1$ in the input query may be a decoding that incorporates associations between the output embedding $\hat{y}_1$ to other inputs $\hat{y}_2$, $\hat{y}_3$ in the set. The self-attention block in a subsequent decoder (e.g., decoders D2, . . . , DN) is coupled to receive an input key a, an input query b, and an input value c that each corresponds to the decoded output of a previous decoder and similarly generate a set of attention representations.

A decoder may also include a first add and normalization layer placed after the self-attention block. In the example shown in FIG. 2, the first decoder D1 includes a first add and normalization layer 258. The first add and normalization layer combines the set of attention representations generated by the self-attention block with the set of inputs received at the self-attention block to generate a combined representation and may further normalize the combined representation. Thus, as defined herein, the self-attention block in a decoder may also be configured as a residual block.

Different from the encoder, the decoder may also include an encoder-decoder attention block that is placed after the self-attention block of the decoder. In the example shown in FIG. 2, the first decoder D1 includes an encoder-decoder attention block 262. The encoder-decoder attention block is coupled to receive an input key a that corresponds to the final encoder output $\tilde{x}$, an input query b that corresponds to outputs from the first add and normalization layer, and an input value c that corresponds to the final encoder output $\tilde{x}$.

Different from the self-attention block, an attention representation for a representation in the input query b may be a decoding of the representation that incorporates associations between the representation in the input query to the encoded output x̃.

The decoder may also include a second add and normalization layer placed after the encoder-decoder attention block of the decoder. In the example shown in FIG. 2, the first decoder D1 includes a second add and normalization layer 266. The second add and normalization layer combines the set of attention representations generated by the encoder-decoder attention block with the set of inputs received at the encoder-decoder attention block to generate a combined representation and may further normalize the combined representation. Thus, as defined herein, the encoder-decoder attention block in a decoder may also be configured as a residual block.

The decoder further includes an MLP block coupled to receive a set of inputs that are the outputs of the second add and normalization layer and generate an MLP output by applying the set of parameters to the set of inputs. In the example shown in FIG. 2, the first decoder D1 includes an MLP block 270. The decoder may further include a third add and normalization layer placed after the MLP block. In the example shown in FIG. 2, the first decoder D1 includes a third add and normalization layer 274. The third add and normalization layer combines the MLP output generated by the MLP block with the set of inputs received at the MLP block to generate a combined representation and may further normalize the combined representation. Thus, the MLP block of a decoder may also be configured as a residual block.

The online system 130 trains the transformer architecture by obtaining a set of training text that each includes an ordered set of training input embeddings and an ordered set of training output embeddings that correspond to known word predictions for the set of training input embeddings that address the task the transformer architecture should be trained for. The online system 130 initializes parameters of the transformer architecture to begin the training process. For each training text in the set, the online system 130 generates one or more estimated output embeddings by applying the set of encoders and the set of decoders to the ordered set of training input embeddings. The online system 130 determines a loss function indicating a difference between the one or more estimated output embeddings and the ordered set of training output embeddings. The online system 130 updates the parameters of the machine-learned model to reduce the loss function for the training text in the set. This process is repeated for multiple training iterations until a convergence criteria for the parameters is reached.

In one embodiment, the online system 130 trains the transformer architecture by an initialization method that scales the parameters of the value matrix v and the output matrix w with a factor that is inverse to a number of residual blocks in the set of encoders or a number of the set of decoders. Typically, the training process for the transformer architecture is difficult because the number of parameters of the transformer architecture can quickly increase with the addition of encoders and decoders. Empirically, the training process for a transformer architecture involved learning rate warmup, in which the magnitude the update at each training iteration was bounded at earlier iterations of the training process and gradually increased as the training progressed. This led to prohibitively slow training time and computational efficiency. While there are other methods that try to improve the training process, these methods require changing the architecture of the transformer model or result in sub-optimal prediction accuracies.

The initialization method used by the online system 130 results from a previously unknown insight that learning rate warmup is needed during the training process of the transformer architecture because of the presence of normalization layers within the set of encoders and the set of decoders. By deploying such an initialization method, the online system 130 can train transformer architectures without normalization layers and thus, without learning rate warmup. Moreover, the initialization method allows the online system 130 to train deep transformer architectures with a significant number (e.g., 200 or more) of encoders and decoders that may open up new avenues for improvement in prediction accuracies or transformer architecture.

Thus, in one embodiment, the online system 130 may also deploy the initialization method to train parameters of a transformer architecture that has one or more encoders or decoders that do not include normalization layers. For example, returning to the example architecture shown in FIG. 2, the first encoder E1 may include a first add layer instead of the first add and normalization layer 208 that combines the set of attention representations generated by the self-attention block 204 with the set of inputs received at the self-attention block 204 to generate a combined representation without performing normalization. The first encoder E1 may also include a second add layer instead of the second add and normalization layer 216 that combines the MLP output generated by the MLP block 212 with the set of inputs received at the MLP block 212 to generate a combined representation without performing normalization. Thus, the self-attention block and the MLP block of an encoder can be configured as residual blocks but without normalization of the combined representations. This structure may be applied to other encoders in the set of encoders.

As another example, the first decoder D1 may include a first add layer instead of the first add and normalization layer 258 that combines the set of attention representations generated by the self-attention block 254 with the set of inputs received at the self-attention block 254 to generate a combined representation without performing normalization, a second add layer instead of the second add and normalization layer 266 that combines the set of attention representations generated by the encoder-decoder attention block 262 with the set of inputs received at the encoder-decoder attention block 262 to generate a combined representation without performing normalization, or a third add layer instead of the third add and normalization layer 274 that combines the MLP output generated by the MLP block 270 with the set of inputs received at the MLP block 270 to generate a combined representation without performing normalization. Thus, the self-attention block, the encoder-decoder attention block, and the MLP block of a decoder can be configured as residual blocks but without normalization of the combined representations. This structure may be applied to other decoders in the set of decoders.

Returning to FIG. 1, the client device 110 is a computing device such as a smartphone with an operating system such as ANDROID® or APPLE® IOS®, a tablet computer, a laptop computer, a desktop computer, or any other type of network-enabled device. In the system environment 100 shown in FIG. 1, the client device 110 allows a user to submit requests to the online system 130 to perform tasks that can be processed by the transformer architecture. For example, a user of the client device 110 may be affiliated with an entity that deploys one or more applications that require natural language processing or other types of tasks that can be processed by the transformer architecture. A request submitted by the client device 110 may be, for example, a request to generate predictions for chatbot applications, a request to translate a sequence of words from one language to another language, a request to synthesize a story or narrative given a sequence of starting words, and the like.

A typical client device 110 includes the hardware and software needed to connect to the network 122 (e.g., via WiFi and/or 4G, 5G or other wireless telecommunication standards). The client device 110 may include an operating system and various applications that run on the operating system that enable the users to submit the requests. For example, the client device 110 may be include browser applications or standalone applications deployed by the online system 130 that allow users of an organization to interact with the online system 130 to submit the requests.

The network 122 provides a communication infrastructure between the client devices 110 and the online system 130. The network 122 is typically the Internet, but may be any network, including but not limited to a Local Area Network (LAN), a Metropolitan Area Network (MAN), a Wide Area Network (WAN), a mobile wired or wireless network, a private network, or a virtual private network.

System Environment

Figure 3:
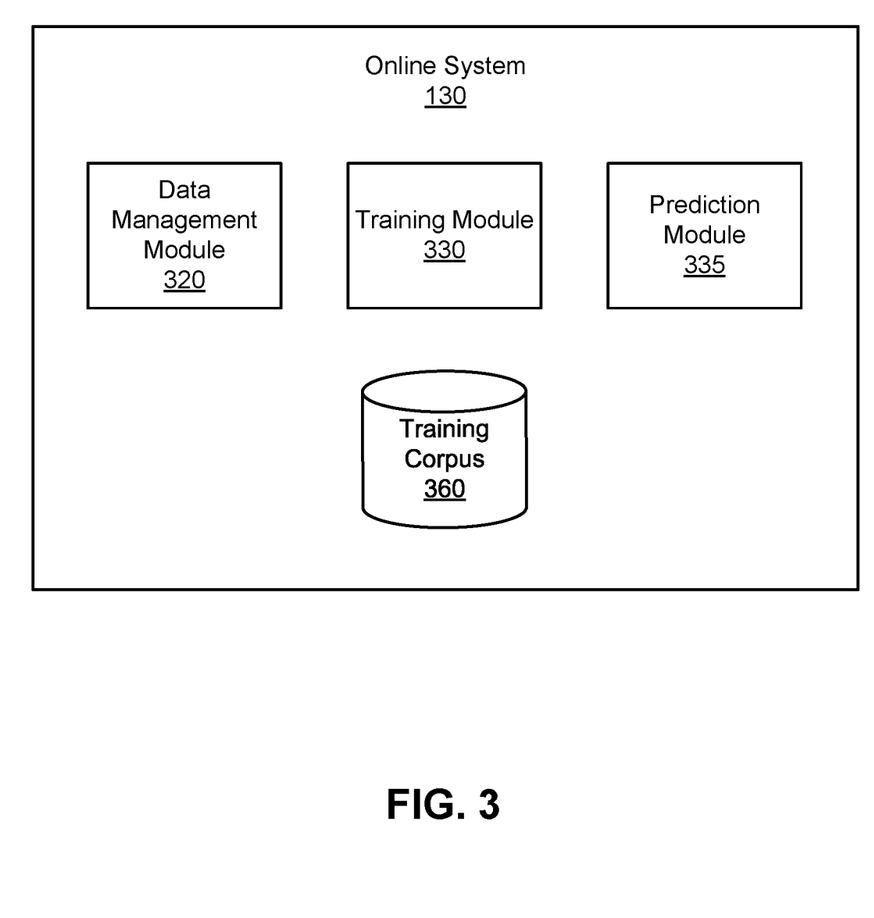
FIG. 3 is a block diagram of an architecture of the online system, in accordance with an embodiment.

FIG. 3 is a block diagram of an architecture of the online system 130, in accordance with an embodiment. The online system 130 shown by FIG. 3 includes a document management module 320, a training module 330, and a prediction module 335. The online system 130 also includes a training corpus 360. In alternative configurations, different and/or additional components may be included in the online system 130.

The document management module 320 manages the training corpus 360 of training data that are used to train a set of parameters of the transformer architecture. In one embodiment, the training corpus 360 includes multiple instances of data that each include an ordered set of training input embeddings and an ordered set of training output embeddings that correspond to known word predictions for the set of training input embeddings that address the tasks the transformer architecture should be trained for. The training input embeddings represent a sequence of input words in a latent space, and the training output embeddings represent a sequence of output words in the latent space.

For example, when the transformer architecture is used for automatic translation from English to German, the set of training input embeddings may correspond to a first sentence of words in English and the set of training output embeddings may correspond to a second sentence of words in German that is a translation of the first sentence. As another example, when the transformer architecture is used for servicing a chatbot application, the set of training input embeddings may correspond to a questions asked by a user of the chatbot application and the set of training output embeddings may correspond to a prediction for an answer to the question.

The training module 330 trains parameters of the transformer architecture during a training process. The training module 330 may generate an appropriate transformer architecture that can address the task requests received by the client devices 110. For example, the transformer architecture may adjust the depth of the transformer architecture by determining the number of encoders and decoders in the machine-learned model. Moreover, the transformer architecture may also include a first embedding block coupled to receive an encoding of a sequence of input words and generate the sequence of input embeddings, and a second embedding block coupled to receive an encoding of a sequence of output words and generate the sequence of output embeddings. As described previously, the transformer architecture may exclude layer normalization in one or more encoders or decoders, and instead may only include an add layer in those positions instead of an add and normalization layer.

The training module 330 may initialize the parameters of the transformer architecture including parameters of attention blocks (e.g., self-attention blocks or encoder-decoder attention blocks) and MLP blocks included in the set of encoders and the set of decoders, and other layers including linear layers placed outside the set of encoders or decoders. In one embodiment, the training module 330 initializes the parameters of the transformer architecture excluding parameters of the embedding blocks using a Xavier initialization method where, for example, the parameters of each layer are initialized by sampling the values of the parameters from a uniform distribution with a range $[-1/\text{sqrt}(n), 1/\text{sqrt}(n)]$, where n is the size of the previous layer. For example, n may be the number or units or elements in the previous neural network layer. The parameters of the embedding blocks may be initialized using Gaussian initialization.

The training module 330 performs the initialization method that scales the parameters of the transformer architecture to improve the training process. In one embodiment, the parameters of the transformer architecture are scaled to satisfy the following equations:

$$L_e(\|v_e\|^2\|x\|^2+\|w_e\|^2\|x\|^2+\|v_e\|^2\|w_e\|^2)=\Theta \quad (1)$$

where $v_e$ denotes parameters of the value matrix in the encoder, $w_e$ denotes parameters of the output matrix in the encoder, x denotes the set of input embeddings, and $L_e$ is the number of residual blocks in the set of encoders (e.g., 2N or 2N+1 where N is the number of encoders in the set), $$L_d(\|v_d\|^2\|w_d\|^2+\|v_d\|^2\|y\|^2+\|w_d\|^2\|y\|^2+\|v_d\|^2\|w_d\|^2+\|v_d\|^2\|m\|^2+\|v_d\|^2\|m\|^2)=\Theta(1)$$

where $v_d$ denotes parameters of the value matrix in the decoder, $w_d$ denotes parameters of the output matrix in the decoder, y denotes the set of output embeddings, m denotes the final encoded output, and $L_d$ is the number of residual blocks in the set of decoders (e.g., 3N or 3N+1 where N is the number of decoders in the set), and $$L_e(\|v_d\|^2\|w_d\|^2)=\Theta(1).$$

In one embodiment, when the set of decoders each include two attention blocks (e.g., self-attention block and encoder-decoder attention block) and a MLP block, the training module 330 may scale parameters of the value matrix v and the output matrix w in each attention block and the parameters of the MLP block by a scaling factor inverse to a number of residual blocks in the set of decoders. Specifically, when the dimensionality of the value matrices and the output matrices are the same, these parameters may be scaled by a scaling factor of $L_d^{-1/4}$, where $L_d$ denotes the number of residual blocks in the set of decoders, and may indicate the total number of attention blocks, MLP blocks, and the embedding block for the set of decoders. For example, $L_d$ may be given by $L_d=3N+1$ or 3N where N is the number of decoders in the set of decoders. In one embodiment, when the set of encoders each include an attention block (e.g., self-attention block) and a MLP block, the training module 330 may scale the parameters of the value matrix v and the output matrix w in each attention block and the parameters of a MLP block by a scaling factor inverse to a number of residual blocks in the set of encoders. Specifically, when the dimensionality of the value matrices and the output matrices are the same, these parameters may be scaled by a scaling factor of $0.67N^{-1/4}$ assuming that there are $L_e=2N$ or $2N+1$ residual blocks in the set of encoders, where N is the number of encoders in the set of encoders.

During the training process, the training module 330 selects a set of training text and trains parameters of the machine-learned model by repeatedly iterating between a forward pass step and a backpropagation step. During the forward pass step, the training module 330 generates one or more estimated output embeddings by applying parameters of the transformer architecture to the ordered set of training input embeddings in the set of training text. The training module 330 determines a loss function indicating a difference between the one or more estimated output embeddings and the ordered set of training output embeddings. During the backpropagation step, the training module 330 updates the parameters of the transformer architecture to reduce the loss function. This process is iteratively repeated for the next sets of training text until a convergence criterion for the parameters is reached.

As described previously, by performing the initialization method, the training module 330 may update the parameters of the transformer architecture without learning rate warmup, such that the training process can be performed faster and in a more computationally efficient manner. Conventionally, the training process of the transformer architecture often required significantly small learning rates at earlier iterations of the training process that bounded how much the parameters could be updated in one iteration, making training prohibitively slow. By deploying the initialization method, the updates to the parameters may be automatically adjusted so that learning rate warmup may no longer be needed.

Figure 4:
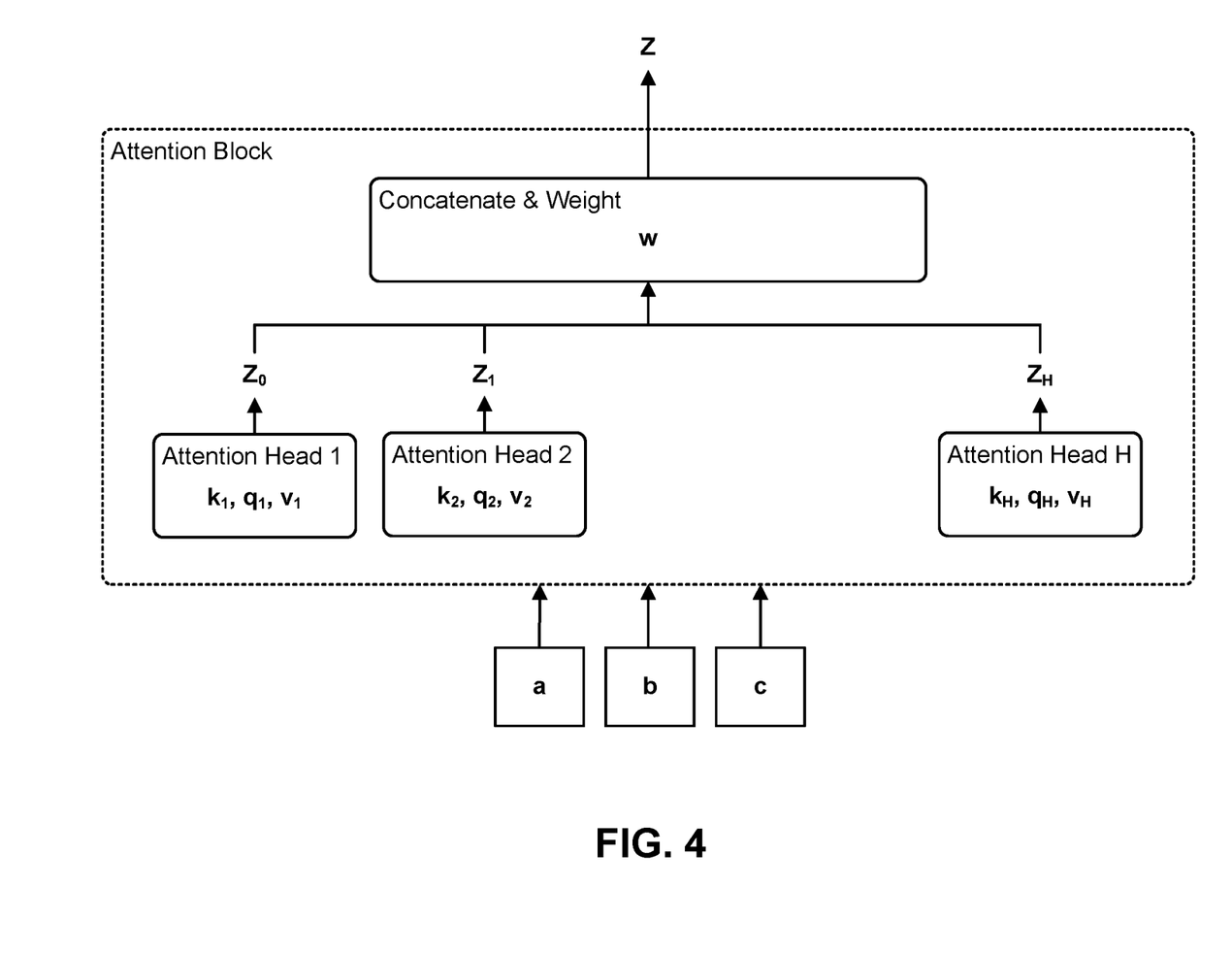
FIG. 4 illustrates an architecture of an attention block of the machine-learned model with multi-head attention, in accordance with an embodiment.

FIG. 4 illustrates an architecture of an attention block of the machine-learned model with multi-head attention, in accordance with an embodiment. In one embodiment, the training module 330 generates a transformer architecture that includes attention blocks with a multi-headed structure. For example, any one or more of or all of the self-attention blocks in an encoder or the self-attention blocks or the encoder-decoder attention blocks in a decoder may have the multi-headed structure.

As shown in FIG. 4, an attention block with a multi-headed structure is coupled to receive an input key a, an input query b, and an input value c and generate a set of attention representations. Specifically, the multi-headed structure includes a plurality of attention heads. Each attention head is associated with its own key matrix k, query matrix q, and value matrix v. The attention head is coupled to receive the input key a, the input query b, and the input value c and generate a respective output by applying the respective key matrix k to the input key a, the respective query matrix q to the input query b, and a value matrix v to the input value c. For example, the attention block in FIG. 4 includes attention heads 1, 2, . . . , H, where an attention head i is associated with its own key matrix $k_i$, query matrix $q_i$, and value matrix $v_i$. An attention head i is coupled to receive the input key a, the input query b, and the input value c to generate a respective output $z_i$. The attention representation for the attention block z is generated by concatenating the outputs $z_1, z_2, \ldots, z_H$ and applying an output matrix w to the concatenated outputs.

As described above in conjunction with FIGS. 1 and 2, each of the key matrices $k_i$, query matrices $q_i$, value matrices $v_i$ may be represented by a set of parameters in any form, not limited to matrix operations. For example, each attention head may include one or more neural network layers (e.g., fully connected layer, skip layer, etc.) that are coupled to receive the input key a, input query b, input value c and generate the respective output $z_i$ by applying a set of parameters for the neural network layers to the input key a, input query b, input value c. The attention block may further include one or more neural network layers (e.g., fully connected layer, skip layer, etc.) coupled to receive the concatenated outputs $z_1, z_2, \ldots, z_H$ and generate the set of attention representations by applying a set of parameters for the neural network layers to the concatenated outputs.

Thus, in one embodiment, when a multi-headed structure is applied to an attention block, the training module 330 may also initialize parameters of the transformer architecture including parameters of multi-attention blocks including each respective key matrix $k_i$, query matrix $q_i$, and value matrix $v_i$ of an attention head. Moreover, the training module 330 may also scale the values of each respective key matrix $k_i$, query matrix $q_i$, and value matrix $v_i$ of an attention head with the scaling factors described above during the initialization method. Subsequently, similar to that described above, the training module 330 repeatedly iterates between the forward pass step and the backpropagation step to train the parameters of the transformer architecture.

The prediction module 335 receives requests from client devices 110 to perform one or more tasks related to, for example, natural language processing (NLP) applications, that can be responded to by using the trained transformer architecture. In one embodiment, when the applications are NLP applications, the requests may include a sequence of words that the prediction module 335 may parse and map into a sequence of input embeddings that can be fed into the transformer architecture, or alternatively, can encode the sequence of words into encodings that can be fed into the transformer architecture such that the input embeddings can be generated within the model.

Responsive to receiving a request, the prediction module 335 may apply the trained transformer architecture to the sequence of input embeddings such that a sequence of output embeddings are generated as predictions. The prediction module 335 may be provided to the client device 110 of the request as the response to the request. In one embodiment, when the training module 330 trains multiple transformer architectures each configured to address a respective task (e.g., translation, chatbot application, etc.) the prediction module 335 may select the appropriate model and apply the model to the request. For example, the prediction module 335 may receive a request from a translation application that includes a sequence of words that represents an English phrase. The prediction module 335 may apply a transformer architecture trained to perform this task to generate the sequence of output words. The prediction module 335 may provide the sequence of output words as the response to the request.

Method of Training Transformer Architecture

Figure 5:
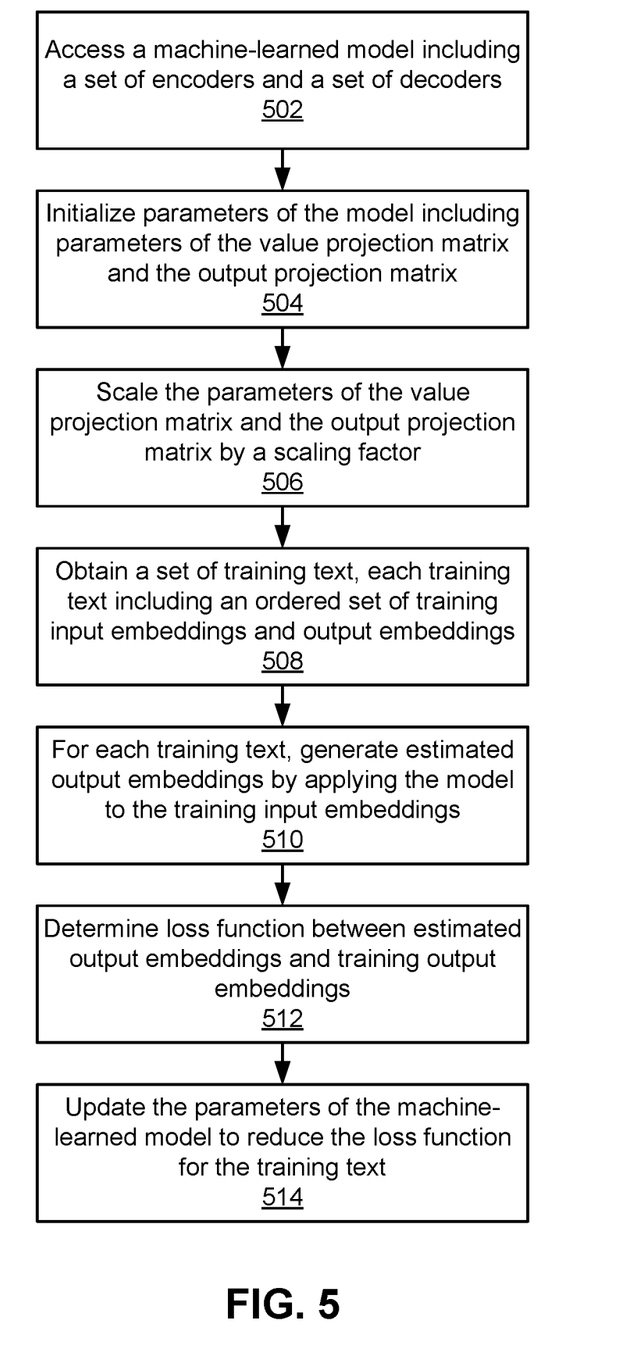
FIG. 5 illustrates a method for training the machine-learned model with a transformer architecture, in accordance with an embodiment.

FIG. 5 illustrates a method for training a machine-learned transformer architecture, in one embodiment. In one embodiment, the process of FIG. 5 is performed by various modules of the online system 130. Other entities may perform some or all of the steps of the process in other embodiments. Likewise, embodiments may include different and/or additional steps, or perform the steps in different orders.

The online system 130 accesses 502 a machine-learned model. The machine-learned model includes a set of encoders and a set of decoders, the set of encoders are coupled to receive a sequence of input embeddings and generate an encoded output, and a set of decoders coupled to receive a sequence of output embeddings and the encoded output and generate a prediction for a next word. At least one encoder of the set of encoders or at least one decoder of the set of decoders includes an attention block. The attention block is coupled to receive an input key, an input query, an input value and generate an attention by applying a key matrix to the input key, a query matrix to the input query, a value matrix to the input value to generate an output, and applying an output matrix to the output to generate the attention.

The online system 130 initializes 504 parameters of the machine-learned model including parameters of the value matrix and the output matrix. The online system 130 scales 506 the parameters of the value matrix and the output matrix by multiplying a scaling factor that is inverse to a number of the set of encoders or a number of the set of decoders.

The online system 130 obtains 508 a set of training text. Each training text includes an ordered set of training input embeddings and an ordered set of training output embeddings. For each training text in the set, the online system 130 generates 510 one or more estimated output embeddings by applying the set of encoders and the set of decoders to the ordered set of training input embeddings. The online system determines 512 a loss function indicating a difference between the one or more estimated output embeddings and the ordered set of training output embeddings. The online system 130 updates 514 the parameters of the machine-learned model to reduce the loss function for the training text in the set.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system comprising:
a processor configured to execute instructions;
a computer-readable medium containing instructions for execution on the processor, the instructions causing the processor to perform steps of:
accessing a machine-learned model including:
a set of blocks that each perform a respective operation on one or more inputs to the block to generate one or more outputs for the block, wherein one or more of the blocks are configured as attention blocks and an attention block is coupled to receive an input key, an input query, an input value and generate an attention by applying a key matrix to the input key, a query matrix to the input query, a value matrix to the input value to generate an output, and applying an output matrix to the output to generate the attention, and wherein at least a subset of the blocks are configured as residual blocks in which an input to a residual block is added to an output of the residual block;
initializing parameters of the machine-learned model including parameters of the value matrix and the output matrix for each attention block;
scaling the parameters of the value matrix and the output matrix by multiplying a scaling factor that depends on a number of the subset of residual blocks;
obtaining a set of training data, each training data instance including an ordered set of training input embeddings and an ordered set of training output embeddings;
determining a loss function indicating a difference between one or more estimated output embeddings and the ordered set of training output embeddings, the estimated output embeddings generated by applying the machine-learned model to the ordered set of training input embeddings; and
updating the parameters of the machine-learned model to reduce the loss function.

2. The system of claim 1, wherein at least one attention block does not include a normalization layer coupled to receive a set of inputs and normalize the set of inputs.

3. The system of claim 1, wherein the set of blocks are arranged as a set of decoders, and at least one decoder includes a first attention block, a second attention block, and a multi-layer perceptron (MLP) block placed after the first and second attention blocks, wherein the first attention block is a self-attention block coupled to receive the input key, the input query, and the input value that each corresponds to the sequence of output embeddings or an output of a previous decoder, and wherein the second attention block is a cross-attention block coupled to receive the input query from the sequence of output embeddings or an output of a previous decoder, and the input key and the input value from an encoder.

4. The system of claim 3, wherein the scaling factor is a number inverse to 3N+1, wherein N is the number of decoders in the set.

5. The system of claim 1, wherein the set of blocks are arranged as a set of encoders, and at least one encoder includes an attention block and a multi-layer perceptron (MLP) block placed after the attention block, wherein the attention block is a self-attention block coupled to receive the input key, the input query, and the input value that each corresponds to the sequence of output embeddings or an output of a previous decoder.

6. The system of claim 5, wherein the scaling factor is a number inverse to 2N+1, where N is the number of encoders in the set.

7. The system of claim 1, wherein the scaling factor is inverse to the number of residual blocks.

8. The system of claim 1, wherein initializing the parameters of the machine-learned model comprises initializing values of at least a portion of the parameters of the machine-learned model using a Xavier initialization method.

9. The system of claim 8, wherein initializing the parameters of the machine-learned model further comprises sampling the values of the at least the portion of the parameters from a uniform distribution with a range of [−1/sqrt (n), 1/sqrt (n)], where n is a size of a previous neural network layer.

10. The system of claim 1, wherein the subset of blocks configured as residual blocks include the one or more blocks configured as attention blocks.

11. A method, comprising:
accessing, by a processor when executing instructions, a machine-learned model including:
a set of blocks that each perform a respective operation on one or more inputs to the block to generate one or more outputs for the block, wherein one or more of the blocks are configured as attention blocks and an attention block is coupled to receive an input key, an input query, an input value and generate an attention by applying a key matrix to the input key, a query matrix to the input query, a value matrix to the input value to generate an output, and applying an output matrix to the output to generate the attention, and wherein at least a subset of the blocks are configured as residual blocks in which an input to a residual block is added to an output of the residual block;
initializing, by the processor, parameters of the machine-learned model including parameters of the value matrix and the output matrix for each attention block;
scaling, by the processor, the parameters of the value matrix and the output matrix by multiplying a scaling factor that depends on a number of the subset of residual blocks;
obtaining, by the processor, a set of training data, each training data instance including an ordered set of training input embeddings and an ordered set of training output embeddings;
determining, by the processor, a loss function indicating a difference between the one or more estimated output embeddings and the ordered set of training output embeddings; and
updating, by the processor, the parameters of the machine-learned model to reduce the loss function for the training data in the set.

12. The method of claim 11, wherein at least one attention block does not include a normalization layer coupled to receive a set of inputs and normalize the set of inputs.

13. The method of claim 11, wherein the set of blocks are arranged as a set of decoders, and at least one decoder includes a first attention block, a second attention block, and a multi-layer perceptron (MLP) block placed after the first and second attention blocks, wherein the first attention block is a self-attention block coupled to receive the input key, the input query, and the input value that each corresponds to the sequence of output embeddings or an output of a previous decoder, and wherein the second attention block is a cross-attention block coupled to receive the input query from the sequence of output embeddings or an output of a previous decoder, and the input key and the input value from an encoder.

14. The method of claim 13, wherein the scaling factor is a number inverse to 3N+1, wherein N is the number of decoders in the set.

15. The method of claim 11, wherein the set of blocks are arranged as a set of encoders, and at least one encoder includes an attention block and a multi-layer perceptron (MLP) block placed after the attention block, wherein the attention block is a self-attention block coupled to receive the input key, the input query, and the input value that each corresponds to the sequence of output embeddings or an output of a previous decoder.

16. The method of claim 15, wherein the scaling factor is a number inverse to 2N+1, where N is the number of encoders in the set.

17. The method of claim 11, wherein the scaling factor is inverse to the number of residual blocks.

18. The method of claim 11, wherein initializing the parameters of the machine-learned model comprises initializing values of at least a portion of the parameters of the machine-learned model using a Xavier initialization method.

19. The method of claim 18, wherein initializing the parameters of the machine-learned model further comprises sampling the values of the at least the portion of the parameters from a uniform distribution with a range of [−1/sqrt (n), 1/sqrt (n)], where n is a size of a previous neural network layer.

20. The method of claim 11, wherein the subset of blocks configured as residual blocks include the one or more blocks configured as attention blocks.

* * * * *